(No Model.)

W. OESTERLEIN.
FRICTION CLUTCH.

No. 378,803. Patented Feb. 28, 1888.

Witnesses
Horace W. Males.
[signature]

Inventor
Wilhelm Oesterlein
By his Attorney
Geo. J. Murray

UNITED STATES PATENT OFFICE.

WILHELM OESTERLEIN, OF CINCINNATI, OHIO, ASSIGNOR TO LOUISE OESTERLEIN, OF SAME PLACE.

FRICTION-CLUTCH.

SPECIFICATION forming part of Letters Patent No. 378,803, dated February 28, 1888.

Application filed June 29, 1887. Serial No. 242,864. (No model.)

*To all whom it may concern:*

Be it known that I, WILHELM OESTERLEIN, a citizen of the United States, and a resident of Cincinnati, in the county of Hamilton and State of Ohio, have invented certain new and useful Improvements in Friction-Clutches, of which the following is a specification.

My invention is an improved friction-clutch for readily coupling a driving-wheel with its shaft.

The invention will be first fully described in connection with the accompanying drawings, in which like parts are represented by similar reference-letters wherever they occur throughout the various views, and then particularly referred to and pointed out in the claims.

Figure 1:
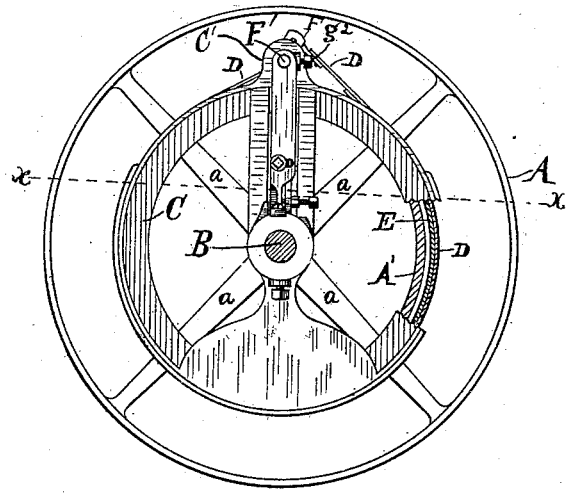
Figure 2:
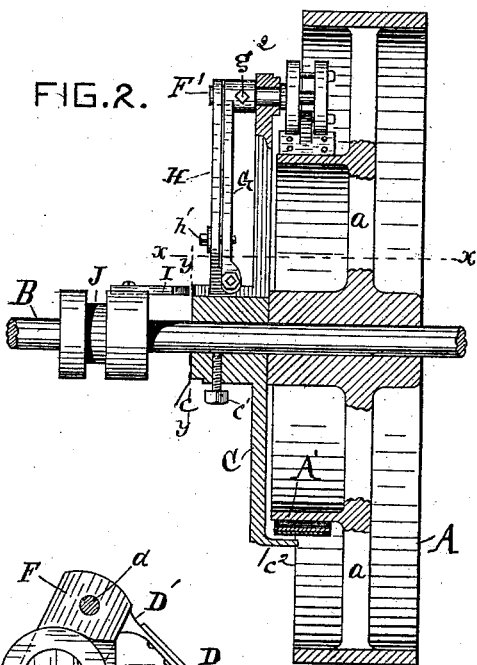
Figure 3:
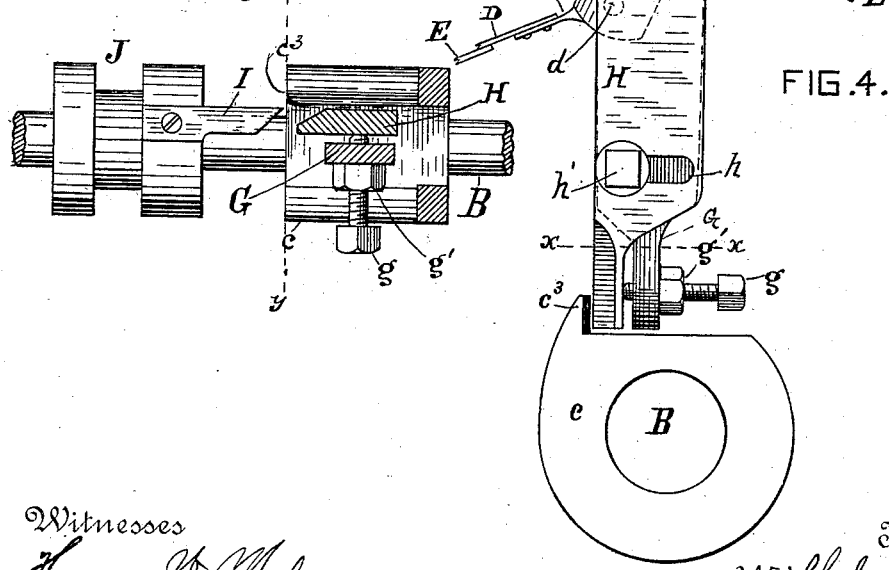
Figure 4:
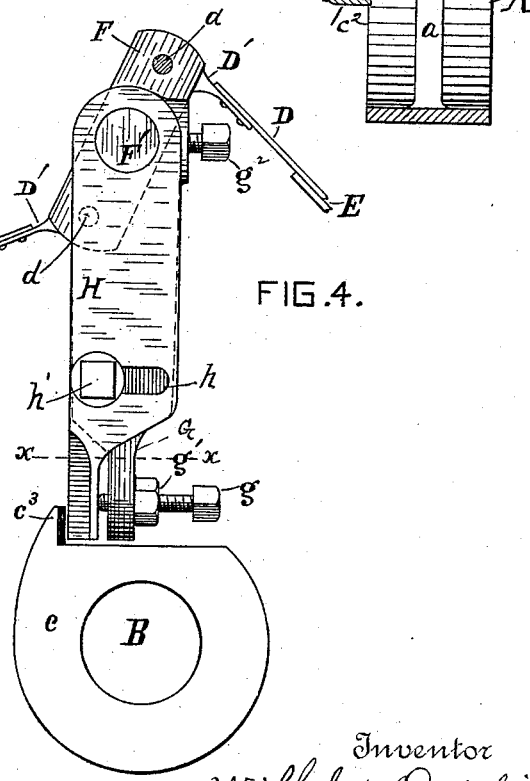

Referring to the drawings, Figure 1 is a side elevation of my friction-clutch and a pulley constructed to be coupled by it. A part of the clutch is broken away to expose the parts back of it, which are shown in section. Fig. 2 is a diametrical section of the same. Fig. 3 is an enlarged detail view taken in line $x\,x$ of Figs. 1, 2, and 4; and Fig. 4 is a greatly-enlarged view through line $y\,y$ of Figs. 2 and 3, showing in side elevation the devices by which the friction-band is clamped upon the pulley-flange.

The pulley A, which is loosely journaled upon shaft B, is provided with a flange, A', which is cast as part of the pulley and projects from one side of the pulley-arms $a$.

C is an armed cast-metal ring provided with a hub, $c$, which is axially perforated to pass upon the shaft B, to which it is secured by a set-screw, $c'$, or in any other well-known manner. The ring or wheel is arranged upon shaft B in proximity to the pulley A, and has a flange, $c^2$, which overhangs the flange A', leaving space enough between the flanges $c^2$ and A' for the friction-band, which consists of two bands, the outer one, D, being of metal, preferably steel, and the inner one, E, being of some flexible friction substance, preferably leather, the leather being simply an inner facing for the steel band D. The ends of the steel band are securely riveted to link-clips D', the ends of which clips are journaled to a slotted cross-head, F, which is preferably in one piece with a shaft, F', which has bearings in a lug, C', projecting outward from the ring or wheel C by bolts $d$, which bolts pass through the slotted arms of the cross-head and eyes formed in the ends of the clips D'.

Upon the projecting end of the cross-head shaft F' is secured a crank-arm, G, and loosely journaled upon the same shaft, alongside of it, is an arm, H, which is transversely slotted at $h$. Through this slot a headed bolt or set-screw, $h'$, passes, and is tapped into arm G, for the purpose of adjusting the arm H nearer to or farther from a flange, $c^3$, formed by cutting away a portion of the hub $c$. The arm H, after being properly adjusted, is held permanently by a set-screw, $g$, which passes through the lower end of the arm G, and is provided with a jam-nut, $g'$, to prevent the screw $g$ from turning after the arms are properly set. The lower diminished ends of the arms G H are reduced in one direction and widened in the other, and overhang the cut-away part of the hub $c$ in front of the flange $c^3$. The end of the arm H is beveled, as is also the end of the flange $c^3$ opposite the beveled end of the arm, for the easy introduction of a nose-piece, I, which is secured upon a sliding collar, J, which is sleeved over the shaft. This collar is grooved to receive the forked end of a shifter-lever, (not shown,) by which the nose-piece I is forced in between the arm H and the flange $c^3$, to throw the arms H and G away from the flange, partially rotate the shaft F' and its cross-head F, and thus tighten the friction-band D E upon the flange A' of pulley A and couple the pulley to the clutch and its shaft.

It will thus be seen that the pulley is gradually started and without jar, the inclined surfaces gradually forcing the arms G H away from the flange $c^3$ until the parallel surfaces of the nose I are forced between the parallel surfaces of the flange $c^3$ and arm H, when the parts will remain in this position without liability of slipping. The flange $c^2$ on clutch-ring C prevents the band from opening too far. The friction of the band upon the flange A' is regulated by changing the relation of the arms G H by the nuts $g\,h'$, and the wear upon the leather lining of the band is compensated for in the same manner. It is obvious that the arm H and set-screws $g\ h'$ may be dispensed with by forming the lower end of the arm G the same as the lower end of the arm H is formed. In this case the friction of the band would be regulated and the wear compensated for by the set-screw $g^2$, which secures the arm G to shaft F'.

By the arrangement of coupling devices herein shown I am enabled to apply my friction-clutch to small as well as large pulleys. The whole device is very compact and strong, but little fitting is required to put the parts together, and there is little liability of their getting out of order.

What I claim is—

1. The combination of the ring or wheel C, having hub $c$ and flange $c^3$, a cross-head and its shaft mounted in said disk, a friction-band having its opposite ends secured to the opposite ends of the cross-head, a crank-arm secured to the cross-head shaft and extending inward to the path of the hub-flange, and a sliding collar provided with a nose-piece, by which the cross-head shaft is rocked to tighten the friction-band, substantially as and for the purpose set forth.

2. The combination, substantially as specified, of the ring or wheel C, having lug C', hub $c\ c^3$, and flange $c^2$, the cross-head F and shaft F', mounted on lug C', the friction-band D E and clips D', and bolts $d$, for securing the opposite ends of said band to the arms of the cross-head, and the adjustable crank-arm consisting of the arms G H, set-screws $g\ h'$, the sliding collar J, and the nose-piece I, for rocking the shaft and cross-head.

3. The combination, substantially as set forth, of the shaft B, the pulley A, having flange A' projecting from arms $a$, ring or wheel C, having flange $c^2$, and cut-away hub $c$, having flange $c^3$, the cross-head F, shaft F', and arms G H, the set-screws $g\ h'$, for adjusting said arms, the friction-band D E, the clips D', and bolts $d$, for securing the band of the cross-head, and the collar J, sleeved over the shaft B and having piece I, for the purpose specified.

WILHELM OESTERLEIN.

Witnesses:
GEO. J. MURRAY,
MARY L. MURRAY.